(No Model.)

V. C. BAILEY.
BAND CUTTER AND FEEDER.

No. 599,584.  Patented Feb. 22, 1898.

Witnesses:
J. S. Bowen
H. B. Keefer

Inventor:
Victor C. Bailey
by James L. Norris
Atty.

THE NORRIS PETERS CO., PHOTO-LITHO., WASHINGTON, D. C.

UNITED STATES PATENT OFFICE.

VICTOR C. BAILEY, OF BATTLE CREEK, MICHIGAN, ASSIGNOR TO THE ADVANCE THRESHER COMPANY, OF SAME PLACE.

BAND-CUTTER AND FEEDER.

SPECIFICATION forming part of Letters Patent No. 599,584, dated February 22, 1898.

Application filed September 8, 1897. Serial No. 650,958. (No model.)

*To all whom it may concern:*

Be it known that I, VICTOR C. BAILEY, a citizen of the United States, residing at Battle Creek, in the county of Calhoun and State of Michigan, have invented new and useful Improvements in Band-Cutters and Feeders, of which the following is a specification.

This invention relates to an improved band-cutter and feeder for use with grain-separators whether in the field or in a barn; and it has for its principal object to provide an adjustable carrier-bottom having attached thereto a series of knives set to coöperate with the rotary knives of the band-cutter to prevent the said rotary band-cutter knives from carrying too large a portion of a bundle through at once and to assist the said rotary knives in disintegrating the bundle and putting the grain into proper condition for feeding to the cylinder.

The invention consists in features of construction and novel combinations of devices in a band-cutter and feeder, as hereinafter described and claimed.

The invention is illustrated in the annexed drawings, in which—

Figure 1:
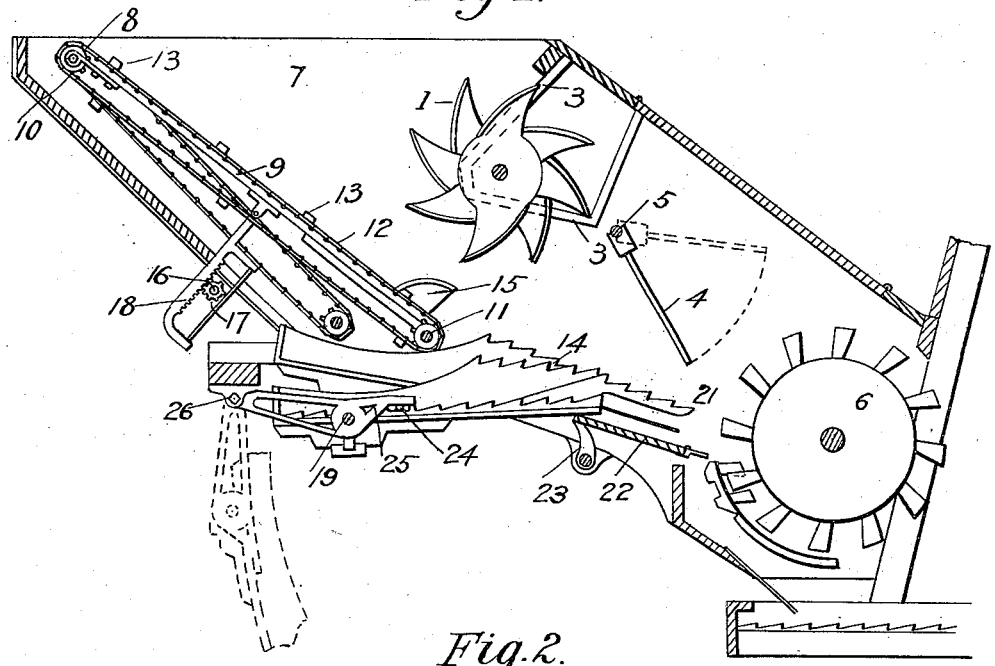
Figure 2:
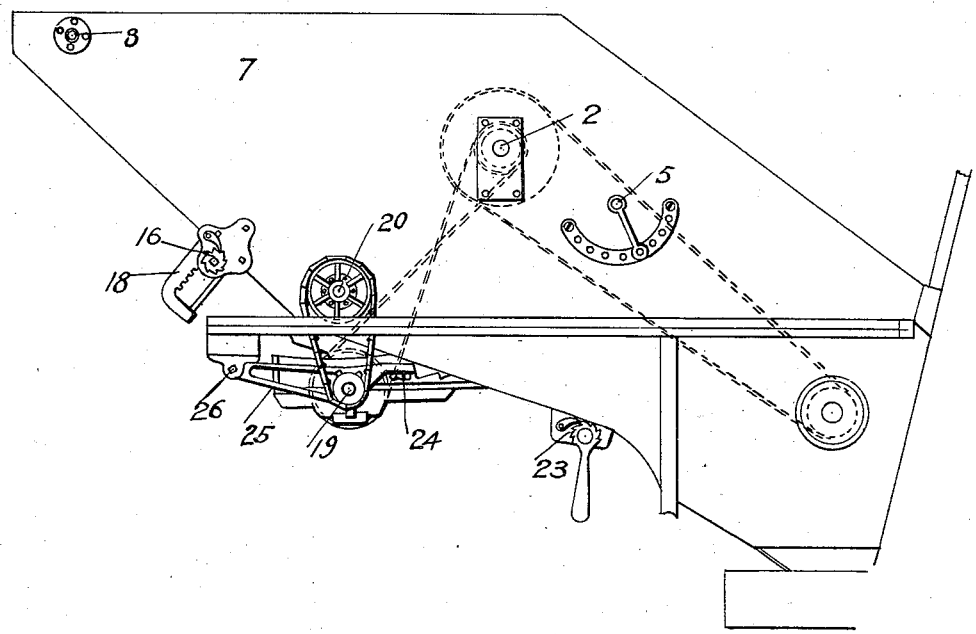

Figure 1 shows in sectional side elevation a grain-feeding and band-cutting apparatus provided with my improvements. Fig. 2 is a side elevation of the apparatus.

Referring to the drawings, the numeral 1 designates the band-cutting knives, which revolve with the cutter-shaft 2, along which they are placed in a spiral line at suitable intervals, say about four inches apart. These knives are so arranged as to pass through the spaces or slots between the guards 3, which prevent the straw from coming in contact with the cutter-shaft and being wound thereon.

There is also provided a flood-gate composed of steel fingers 4, hanging from a pivot 5 and capable of being held in adjusted position by any suitable means, so as not to fall below any desired angle, these fingers being designed to prevent the knives 1 from throwing the grain on top of the cylinder 6 by always lying on top of the passing grain and accommodating themselves to any quantity or bulk of grain by rising and falling as the grain passes.

In suitable boxes or bearings provided on the sides 7 of the feeder there is mounted a transversely-arranged shaft 8, from which is swung an adjustable downward and forwardly inclined carrier-bottom 9 by means of boxes 10, secured to the upper end of said bottom and through which it is mounted on the said shaft. The lower end of the adjustable bottom 9 is provided with boxes in which a transversely-arranged shaft 11 is mounted. To the shafts 8 and 11 are attached, respectively, a series of sprocket-wheels carrying chains 12, to which are secured short blocks 13 for conveying the grain forward and under the band-cutting knives 1 and depositing it upon the reciprocating feed-pans 14, that convey it to the cylinder. By loosening the bolts on the boxes 10 through which the carrier-bottom 9 is mounted on the shaft 8 the adjustable bottom can be forced endwise toward the cylinder 6, so as to tighten all the sprocket-chains at once should they become loose by wear.

To the lower or inner end of the adjustable carrier-bottom 9 there is rigidly attached a series of upward-projecting knives 15, set about four inches apart and so arranged as to alternate with the rotary knives 1 in such manner as to prevent the said rotary knives from carrying too large a portion of a bundle through at once. These rigidly-attached knives 15 also assist the rotary knives 1 in disintegrating the bundle and putting the grain into proper condition for the cylinder.

For the purpose of adjusting the carrier-bottom 9 there is provided a shaft 16, extended across the under portion of the feeder and carrying two small gears 17, engaging with teeth or cogs on racks 18, the upper or inner ends of which are pivotally connected with the under side of the adjustable bottom. Thus by rotating the shaft 16, through a crank or hand wheel thereon, the inner or lower end of the adjustable bottom may be raised or lowered to any extent required, so as to effectually control the quantity of grain passing through the feeder. This can be done from the ground in an instant while the machine is running, and by means of a suitable pawl-and-ratchet gear the shaft 16 can be locked, so as to hold the bottom 9 in any position to which it may be adjusted. The throat of the feeder can be nearly closed, so as to leave an opening only about seven inches high, which would allow only a limited amount of grain to pass in case the grain was wet and tangled and in bad condition, or the throat can be opened to its full depth and thus allow the feeder to pass grain to the full capacity of the separator, or the adjustable bottom 9 can be moved to any point between the two extremes.

The feeding-pans 14 are connected with and operated by a crank-shaft 19, driven from the rotary cutter-shaft 2, which is driven directly from the cylinder. The carrier-chains 12 are actuated from the shaft 8, driven by sprocket-gearing from a shaft 20, that is driven in turn from the crank-shaft 19 by sprocket-gearing or otherwise.

To the inner ends of the feeding-pans 14 there are attached series of fingers 21, which extend close to the cylinder-teeth. These pans 14, with their attached fingers, carry the grain forward to the cylinder 6 after leaving the band-cutter knives. The inner ends of the feeder-pans normally rest on a feed-board 22, which is hinged at its end next the cylinder and is adjustable up and down at its outer end by means of a ratchet 23, as usual, thus enabling the operator to feed the grain higher or lower upon the cylinder, as the condition of the grain may require. In case it is desired to have access to the cylinder 6, as for tightening the cylinder-teeth, the removal of a nut or bolt 24 will permit the bracket 25 and pans 14 to be swung down on the pivot 26, so as to drop down and outward, as shown by dotted lines, thus giving as free access to the cylinder as though the feeder was wholly removed.

The adjustment of the feeder to control the quantity of grain passed to the separator is easily and quickly effected, and the entire apparatus can be readily made available either for field use or for employment in any barn where the separator can be also used.

What I claim as my invention is—

In a band-cutter and feeder, the combination with the rotary knives 1 and the reciprocating feed-pans 14, of the adjustable downward and forwardly inclined carrier-bottom 9 having its lower end over the feed-pans, upwardly-projecting knives 15 rigidly attached to the said lower end of the carrier-bottom, and an endless traveling carrier 12 mounted on the said carrier-bottom, substantially as shown and described.

In testimony whereof I have hereunto set my hand in presence of two subscribing witnesses.

VICTOR C. BAILEY.

Witnesses:
WM. M. HATCH,
L. B. ANDERSON.